Sept. 29, 1936.  E. B. NOTTINGHAM  2,055,826
VENETIAN BLIND LIFTING DEVICE
Filed Sept. 24, 1934
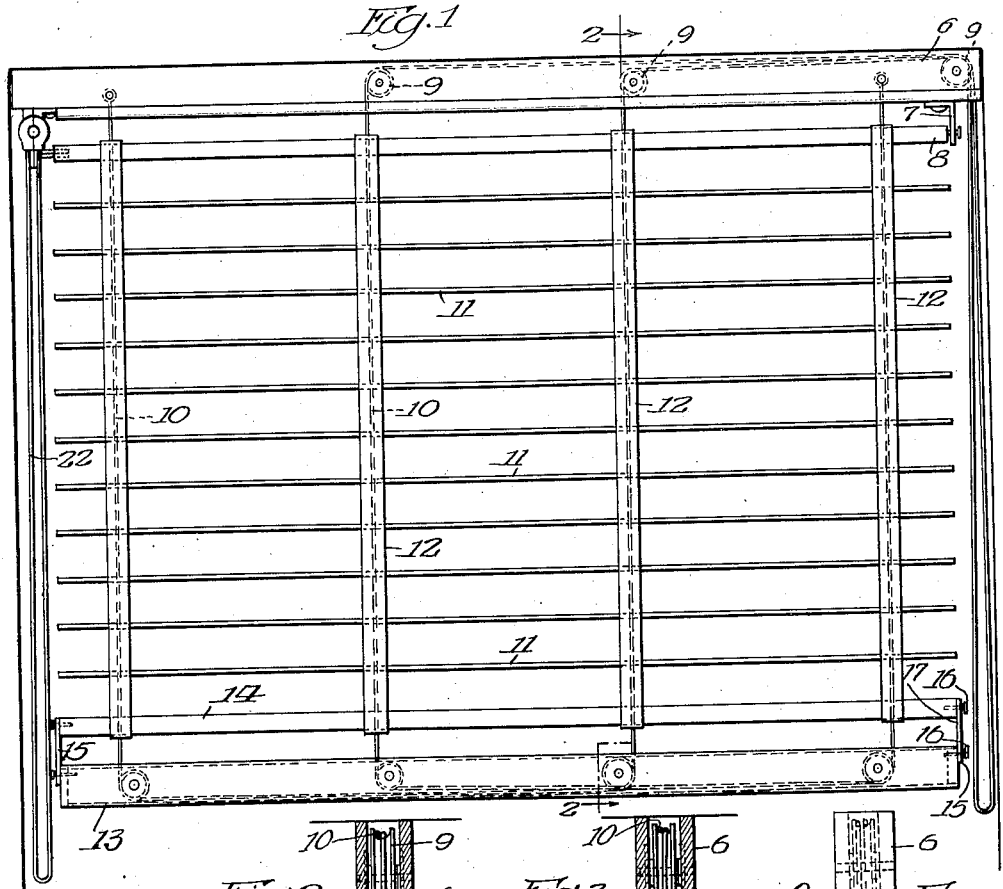
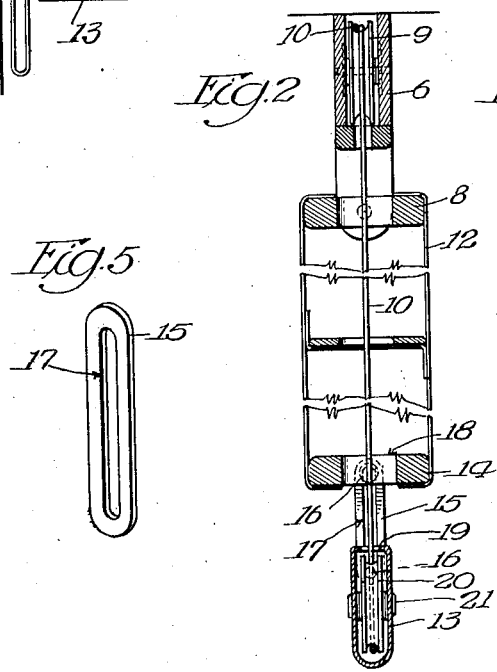
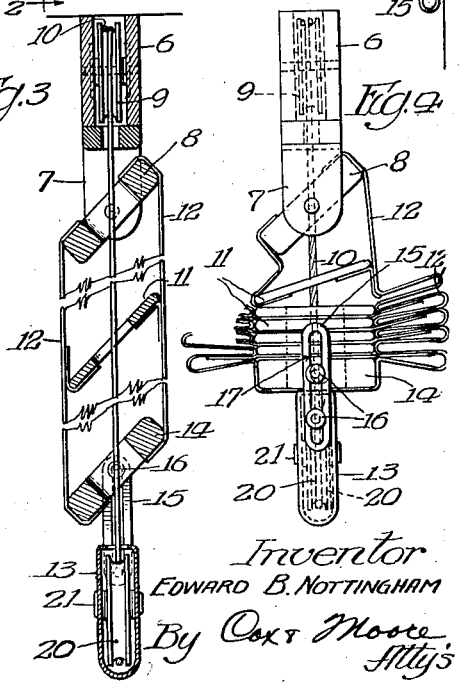
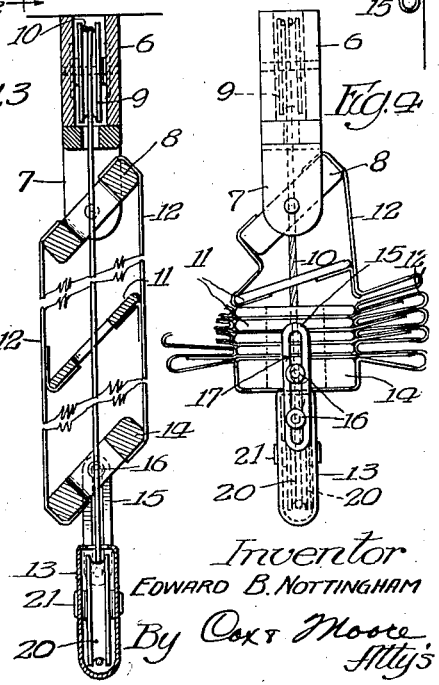
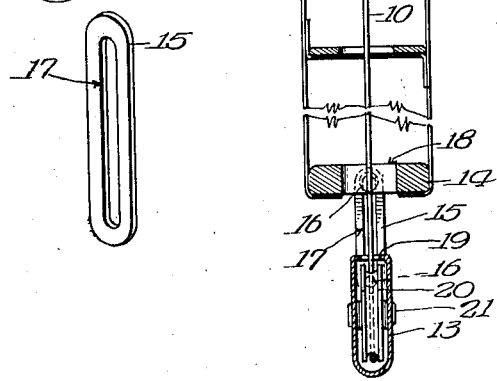
Inventor
EDWARD B. NOTTINGHAM
By Cox & Moore
Atty's Patented Sept. 29, 1936

2,055,826

UNITED STATES PATENT OFFICE 2,055,826

VENETIAN BLIND LIFTING DEVICE

Edward B. Nottingham, Villa Park, Ill., assignor to H. B. Dodge and Company, Chicago, Ill., a corporation of Illinois Application September 24, 1934, Serial No. 745,262

13 Claims. (Cl. 156—17)

This invention relates to Venetian blinds, and particularly to devices secured to the Venetian blind for operating the blind.

The primary object of the present invention is to provide a device attached to a Venetian blind for permitting easy operation thereof by the use of a housing which is vertically positioned, thereby permitting the use of larger sheaves or pulleys than used.

Another object of the invention is to provide a Venetian blind having a top bar, and a bottom bar which is pivotally suspended from parts of the blind. The bars contain relatively large sheaves, which always remain in an upright position regardless of the position of the slats.

A further object is to provide a device arranged in a housing which is pivotally fastened to the bottom bar of a blind, and which is relatively heavy in weight, so that the housing will always remain in upright, vertical position regardless of the position of the slats.

A still further object of the invention is to provide a housing containing relatively large sheaves, the housing being pivotally attached to the bottom bar of a Venetian blind, whereby the housing and its sheaves will always remain in vertical position even though the slats are in tilted position and not in horizontal position.

Numerous other objects and advantages will be apparent throughout the progress of the following specification.

The accompanying drawing illustrates a selected embodiment of the invention, and the views therein are as follows:

Fig. 1 is a detail elevation of a Venetian blind and embodying the invention.

Fig. 2 is a detail vertical sectional view on the line 2—2 of Fig. 1, with the slats in horizontal position.

Fig. 3 is a view similar to Fig. 2, but showing the Venetian blind slats in tilted position.

Fig. 4 is a detail end elevation, showing the blind in raised position.

Fig. 5 is a detail perspective view of the means which secure the lower housing to the bottom bar.

The particular Venetian blind herein shown, for the purpose of illustration, has a top bar or supporting member 6 which is adapted to be fixed to a part of a casing of a window or other opening. A bracket 7 is fastened to the top bar and pivotally supports a tilting bar 8. Pulleys or sheaves 9 are arranged in the top bar 6 and a double lifting cord 10 passes over these pulleys. The cord 10 also passes through aligned openings in the slats 11, and tapes 12 are provided for supporting the slats in proper spaced relationship.

In the conventional type of cord and pulley Venetian blinds, the cord 10 passes over rollers or sheaves in the bottom bar. In the present invention, a device is secured to the bottom bar and suspended therefrom, and this latter device carries lower pulleys or sheaves which align with the pulleys or sheaves in the supporting member or top bar 6. However, in the conventional type of Venetian blinds, should the slats be tilted, as shown in Fig. 3, the bottom bar will also be tilted, making the blind relatively hard to operate. The present invention, however, overcomes these difficulties, and by suspending a housing from the bottom bar and arranging the pulleys or sheaves in the housing, the pulleys or sheaves will always be in proper alignment and in vertical arrangement, regardless of the position of the slats.

A housing 13 is pivotally suspended from the bottom bar 14 by means of a slotted link 15 fastened on each end of the bottom bar and housing. The bottom bar is provided with a stud or fastening member 16 which passes through the elongated slot 17 in the link 15. The housing 13 is also provided with a fastening member 16 passing through the opening 17 in the link 15 for pivotally suspending the housing to the bottom bar, there being a link and fastening connection on each side of the blind, as clearly shown in Fig. 1.

Instead of the cord 10 passing around sheaves in the bottom bar 14, the cord passes through apertures 18 formed in the bottom 14 and through apertures 19 formed in the top of the housing 13. The cords then pass around sheaves 20 vertically arranged on the horizontal pivots 21 in the housing 13. The cords then pass around the other sheaves in the usual conventional manner. The operation of the blind is practically the same as the conventional cord and pulley type of Venetian blinds, with the exception that the bottom bar carries a housing which is pivotally suspended therefrom.

The rollers or sheaves 9 in the top bar 6, and the rollers or sheaves 20 in the housing 13 are relatively large, being much larger in diameter than the rollers or sheaves heretofore used. The lifting cord 10, in passing over these large diameter sheaves or rollers, lends more leverage to the operation of the blind, thereby making it considerably easier to raise a large, heavy blind than was heretofore possible. The lower rollers or sheaves 20 are revolubly mounted in the relatively heavy lower casing 13, and the weight of this housing tends to hold the housing in its vertical position. Should, however, the tilting cord 22 be operated to tilt the slats, as shown in Fig. 3, the housing 13 would still hang vertically from the bottom bar, as shown in Fig. 3. When the operating cord 10 is pulled, the housing would still remain vertically, as the slats have a tendency to straighten themselves out after a sufficient number of slats are piled on top of the bottom bar, as shown in Fig. 4. As the operating cord 10 is operated to raise the slats, the housing will tend to rise upwardly to engage the bottom bar. When the housing 13 engages the bottom bar 14, as shown in Fig. 4, the slats will have assumed their horizontal position, and the housing 13 will still remain in vertical position. Therefore, inasmuch as the lower rollers or sheaves 20 are always in an upright position, ease of operation is assured, regardless of the size of the blind.

Another important feature aiding in ease of operation lies in the fact that relatively larger pulleys or sheaves are used. In the past, the lower rail rollers or sheaves have been located in the bottom bar and consequently assumed the tilted position of the bar in which they were housed. This, of course, resulted in additional friction when the blind was raised in tilted position.

The present invention incorporates the use of an independent lower roller or sheave housing pivotally suspended or hung from the lower bar, and this lower housing is kept vertical by the gravitation of its own weight.

The invention provides a housing containing relatively large sheaves, the housing being pivotally suspended from the bottom bar of a Venetian blind, whereby the sheaves arranged in the housing will always be in vertical position and in proper alignment with the vertically positioned sheaves mounted in the top bar, regardless of the position of the slats.

The pulleys, rollers, or sheaves are relatively large in diameter, and therefore the cords passing over these large pulleys lend additional leverage to the operator of a blind, making it considerably easier to raise the blind. The pivotal suspension of the pulley-carrying housing reduces friction when the blind is operated. The housing is pivotally connected to the bottom bar by means of slotted links pivotally engaging the housing and the bottom bar at the ends of these members.

The invention is simple and efficient in construction, provides easy operation of the blind, eliminates friction, and may be readily and economically manufactured.

Changes may be made in the form, construction and arrangement of the parts, without departing from the spirit of the invention or sacrificing any of its advantages, and the right is hereby reserved to make all such changes as fairly fall within the scope of the following claims.

The invention is hereby claimed as follows:

1. A Venetian blind comprising a lower bar, a slotted link pivotally connected to said lower bar at opposite ends thereof, a housing pivotally connected to said links, sheaves in said housing, and a blind operating member cooperating with the sheaves to raise and lower the blind.

2. A Venetian blind comprising a lower bar, a slotted link pivotally connected to said lower bar at opposite ends thereof, a housing pivotally connected to said link, an upper bar having pulleys, pulleys arranged in said housing, and an operating cord passing about said pulleys.

3. A Venetian blind comprising a top bar, a tilting bar suspended below the top bar, vertical members extending downwardly from said tilting bar, a lower bar and a housing operatively fastened to said vertical members, and relatively large rollers each pivoted on a horizontal axis in said upper bar and said housing.

4. A Venetian blind comprising a top bar, a tilting bar suspended below the top bar, vertical members extending downwardly from said tilting bar, a bottom bar fastened to said vertical members, a housing pivotally suspended from the bottom bar, relatively large rollers pivoted on horizontal axes in said upper bar and in said housing, and an operating cord cooperating with said rollers and passing through said upper and bottom bars into said housing and about said rollers.

5. A Venetian blind comprising a top bar, a tilting bar suspended below the top bar, vertical members extending downwardly from said tilting bar, a bottom housing operatively fastened to said vertical members, relatively large rollers pivoted on horizontal axes in said upper bar and housing, and an operating cord passing through said housing and operatively engaging said rollers.

6. In a Venetian blind, a top bar and a bottom bar, a housing connected below said bottom bar, and means suspending said housing from said bottom bar, whereby said housing will always remain in vertical position.

7. In a Venetian blind, a top bar and a bottom bar, a housing connected below said bottom bar, fastening means projecting from said bottom bar and housing, and a slotted link receiving the projecting means whereby the housing will be pivotally suspended from said bottom bar and remain in vertical position during operation of the blind regardless of the position of the blind slats.

8. A Venetian blind comprising a bottom bar, and a pulley supporting housing pivotally depending from said bottom bar.

9. A Venetian blind comprising a bottom bar, a housing pivotally suspended from said bottom bar, rollers revolubly mounted in said housing, said housing having openings therein to receive a Venetian blind operating cord.

10. In a Venetian blind comprising spaced slats, upper and lower rollers for raising and lowering the slats, and means for maintaining said lower rollers in vertical position, regardless of the position of the slats on their axes.

11. In a Venetian blind comprising a plurality of spaced slats, a tilting bar, means fastened to the tilting bar and engaging the slats, whereby the slats will assume the same position as the tilting bar, and a bottom bar; a housing pivotally suspended from the bottom bar, cord rollers revolubly mounted in said housing, and means whereby said housing may be maintained in vertical position regardless of the position of the slats.

12. In a Venetian blind, a top bar, a bottom bar, slat carrying means for connecting said top and bottom bars, a housing, pivotal means for suspending the housing from the bottom bar and means including a cord for raising and lowering said bottom bar and housing.

13. In a Venetian blind comprising a plurality of spaced slats, a tilting bar, means fastened to the tilting bar and engaging the slats whereby the slats will assume the same position as the tilting bar, and a bottom bar; a housing operatively associated with the bottom bar, cord rollers revolubly mounted in said housing, and means whereby said housing may be maintained in vertical position regardless of the position of the slats.

EDWARD B. NOTTINGHAM.